United States Patent [19]
Chardon

[11] 3,772,686

[45] Nov. 13, 1973

[54] ELECTROMAGNETIC INDICATOR HAVING ROTATING SPHERE

[76] Inventor: Felix A. Chardon, 32 Cape Rd., New Hope, Pa. 18938

[22] Filed: Aug. 17, 1971

[21] Appl. No.: 172,444

[52] U.S. Cl. .................... 340/373 R, 340/378 R
[51] Int. Cl. .................... G08b 5/00, G08b 23/00
[58] Field of Search .................... 341/378 R, 373 R

[56] References Cited
UNITED STATES PATENTS

| | | | |
|---|---|---|---|
| 3,289,131 | 11/1966 | Watkins | 340/378 R |
| 3,353,174 | 11/1967 | Lang | 340/378 R |
| 3,364,481 | 1/1968 | Fuzzell | 340/373 R |
| 3,487,403 | 12/1969 | Pihl | 340/373 R |
| 3,636,557 | 1/1972 | Watkins | 340/373 R |

*Primary Examiner*—Harold I. Pitts
*Attorney*—Harold W. Adams

[57] ABSTRACT

This invention is an electromagnetic indicator of the type wherein a permanent magnet is caused to rotate a sphere to display positional identifying indicia on the sphere in response to the field of an adjacent magnetizable core mounted in an electromagnetic coil. The center of mass of the core is distributed to displace the axis of the permanent magnet at a positive angle relative to the center line of the core when the coil is energized, the permanent magnet latching the sphere to the core at said offset angle upon deenergization the coil and demagnetization of the core at each respective display position of the sphere. The angle of offset of the permanent magnet imparts torque to assist in rotating said shpere upon a reversal of the energization of the coil and magnetic poles of the core. A reset magnet may also be provided to return the sphere to its initial position upon demagnetization of the core.

11 Claims, 7 Drawing Figures

PATENTED NOV 13 1973 3,772,686
SHEET 1 OF 2
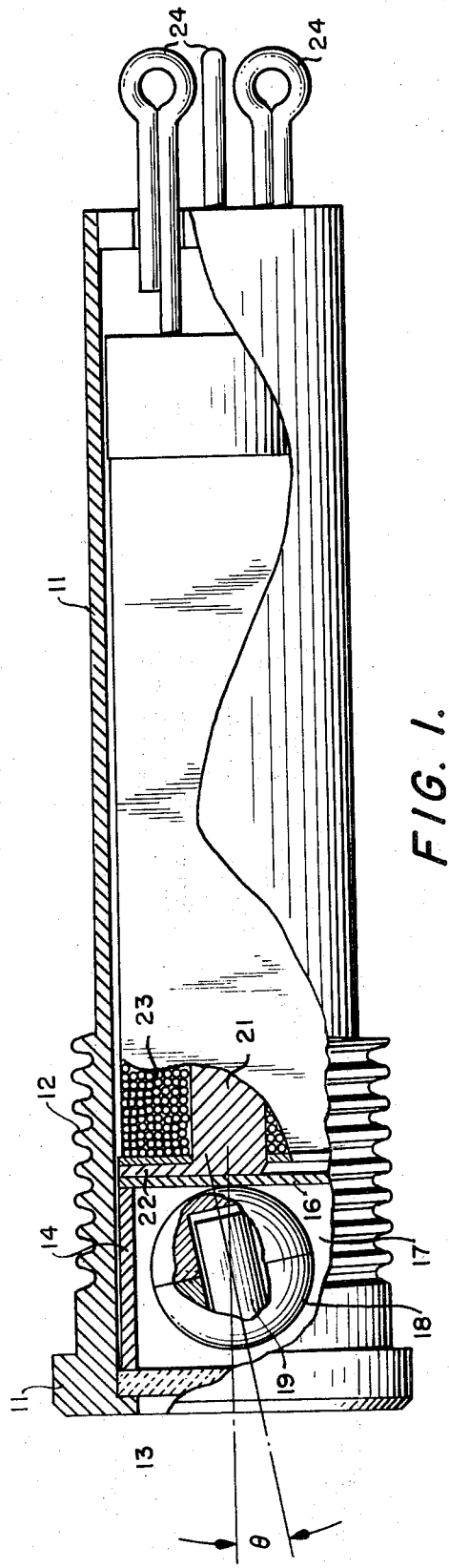
FIG. 1.
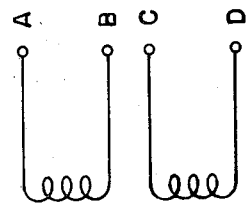
FIG. 5.
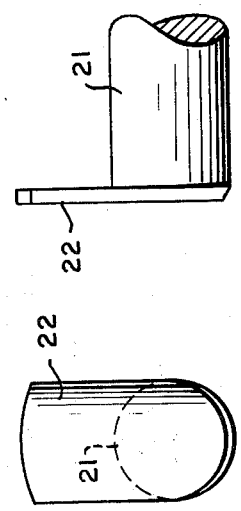
FIG. 4.
FIG. 3.
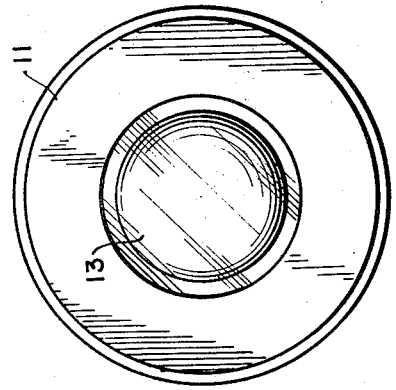
FIG. 2.
INVENTOR.
FELIX A. CHARDON
BY Harold W. Adams
ATTORNEY

INVENTOR.
FELIX A. CHARDON

BY Harold W. Adams
ATTORNEY

3,772,686

ELECTROMAGNETIC INDICATOR HAVING ROTATING SPHERE

BACKGROUND OF THE INVENTION

Electromagnetic indicators including a rotatable permanent magnet, a core, and means for temporarily magnetizing the core to create a magnetic attraction between the permanent magnet and the core and thus causing the permanent magnet to rotate are well known. For instance see the following U. S. Pats. as being representative:

No. 3,553,619 Skrobisch
No. 2,379,542 Rempt
No. 3,524,358 Dick, et al
No. 3,406,388 Pihl
No. 3,573,812 Pihl Known devices may also include separate magnets for latching the permanent magnet into position to prevent vibrational forces from effecting the accuracy of the indicator. Other known devices employ additional permanent magnets and mechanical stops to latch the indicator against vibration and shock. However this design approach, because of the normal limited power available from the electromagnet, requires complex rotational devices, additional magnets, shafts and stops to provide an indicator meeting all operating requirements.

BRIEF DESCRIPTION OF INVENTION

An object of this invention is to provide an electromagnetic indicator including a permanent magnet that acts as a rotor; a temporarily magnetizable core; and an electromagnetic coil for selectively magnetizing said core, the end of said core adjacent the permanent magnet being formed so as to distribute the effective center of mass of said core causing said permanent magnet to assume a position offset at a positive angle from the center line of said core when magnetized, the permanent magnet effecting the latching and the angle of offset of the permanent magnet imparting a rotational torque force to said permanent magnet upon a reversal of the magnetism of said core.

The core end may be formed with an offset shoulder or provided with a bore of selected depth and diameter at varying angles relative to the longitudinal axis of the core to effect distribution of the mass of the core and thus the angle of offset of the permanent magnet relative to the longitudinal axis of the core.

A return magnet may also be provided to overcome the latching force of the permanent magnet upon demagnetizing the core of the electromagnet.

BRIEF DESCRIPTION OF THE DRAWINGS

The objects and advantages of this invention will become apparent from the following detailed description of preferred embodiments of the invention when read in view of the appended drawings wherein:

FIG. 1 is a partial sectional side elevational view illustrating a preferred embodiment of the invention and including a core having a formed end within an electromagnetic coil;

FIG. 2 is an end view illustrating a transparent end cover;

FIG. 3 is an enlarged end view of the core shown in FIG. 1;

FIG. 4 is an enlarged side elevational view illustrating the end of the core as it would appear removed from the coil;

FIG. 5 is a schematic illustrating a wiring diagram for selectively energizing said coil;

Referring now to FIGS. 1–4 of the drawings a preferred embodiment of the invention comprises a cylindrical shell or casing 11 having external means such as threads 12 for mounting the device within a panel or the like. A transparent eye or end piece 13, inner sleeve 14 and disc 16 define a closed chamber 17 within the casing which receives sphere 18. The sleeve 14 may be made of any suitable material providing a surface having a low co-efficient of frictional resistance. The disc 16, may be formed of any nonmagnetic material, the coefficient of frictional resistance to the rotation of the freely mounted sphere not being as critical as that for the sleeve 14.

Figure 7:
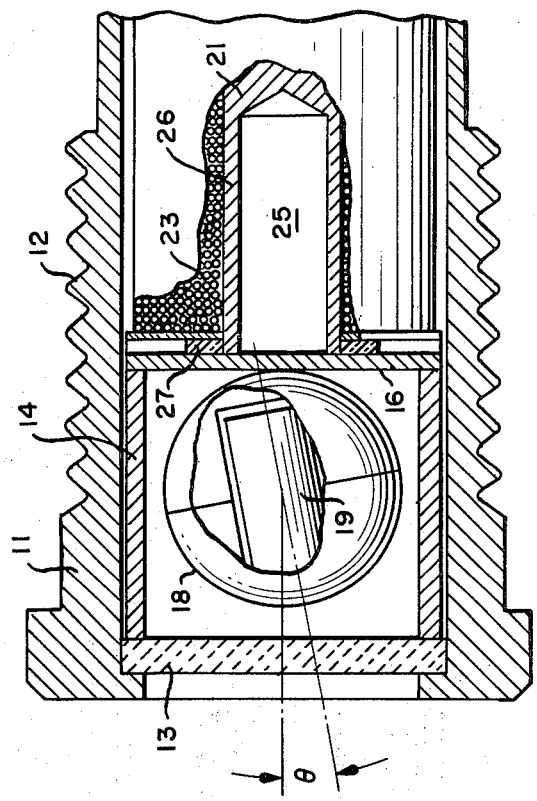
FIG. 7 is a side elevational view in partial cross-section of the alternative embodiment showing FIG. 6 and including a return magnet.

The exterior surface of the sphere 18, may be multicolored such as read and green or bear other forms of indicia indicating its rotational position within the chamber 17 when viewed through transparent eyepiece 13. The sleeve 14, and disc 16 may be of a light reflective color to improve the visibility of the sphere 18 within the chamber.

A cylindrical permanent bar magnet 19 providing North and South magnetic poles at opposite ends is mounted within the sphere and as will be explained rotates the sphere within the chamber. The center line of the permanent magnet 19 lies on the diameter of the sphere 18, the center of mass of the permanent magnet 19 and sphere 18 coinciding. In this embodiment the sphere 18 rotates to display one of two colors red or green for each of the two display positions.

Cylindrical core 21 formed of a magnetic material, extends through the casing 11, the longitudinal center lines of the chamber 17, core 21, and casing 11, coinciding. End 22 of core is flared as shown in FIGS. 1, 3 and 4, to provide a flange or shoulder offset from the center line of the core 21, the sphere 18, chamber 17, and normally the center line of permanent magnet 19, in the absence of said shoulder 22.

The core is surrounded by windings AB and CD forming coil 23 which are brought out of the casing 11 on terminal pins 24 respectively.

The core 21 is formed of a high permeability magnetic material such as a nickel-iron alloy annealed so as to retain a very low or negligible magnetism when both of the coils AB and CD are deenergized. The low residual magnetism of the core 21 permits the use of a low power coil 23 to provide sufficient flux to overcome the magnetic attraction between the permanent magnet 19 and the core 21 with a minimum duration of energizing voltage applied to either winding.

By pulsing winding A-B, with a DC voltage, the electromagnetic field of the coil saturates the core producing a North pole at the forward end 22 of the core adjacent the permanent magnet and a South pole at the other end of the core 21. The North pole of the core, including shoulder 22 and in continuation with the field of coil 23 attracts the South pole of the permanent magnet 19 is disposed opposite the end 22 of core 21 and separated therefrom by the non-magnetic disc 16 and assume the position shown in FIG. 1. The sphere 18 is then in a display position, the distinct colored section or other identifying indicia being visible through the window 13.

Removal of the voltage from coil A-B allows the South pole of the permanent magnet 19 to attract the core 21 through the disc 16 to effectively lock or latch the sphere 18 in the display position against shock and vibration. As can be seen in FIG. 1 the longitudinal axis of the casing 11, core 21, and chamber 17, coincide while the longitudinal axis of the cylindrical permanent magnet 19 is offset from the core axis by the positive angle $\theta$. The angle of offset $\theta$ is determined by the distribution of mass of the flared head or shoulder 22 of the core.

As shown in FIGS. 3 and 4 the length and thickness of the shoulder 22 may be varied to distribute the center of mass of the core 21 to effect the desired angle of offset $\theta$ which for best performance is within the range of 5°-20°. The presence of offset angle $\theta$ assures the application of a positive torque to the permanent magnet 19 and sphere 18 to effectively cause the sphere 18 to rotate upon application of an opposite electromagnetic field to the core by means of a pulsing coil CD. This produces a South pole at the forward end of core reversing the position of the sphere to display the other half of the multicolored sphere through the window. The sphere 18 rotates through 180° and again assumes a display position with the axis of the permanent magnet offset from the axis of the core by the angle $\theta$.

As can be seen variations in the design of the shoulder 22 of the core 21, the air gaps between the core 21 and the permanent magnet 19, and the coil 23 controls the response of the sphere 18 to the duration of the pulse of the applied voltage as well as the resistance of the sphere 18 to vibration and shock in the latched position when coil 23 is deenergized.

The magnetization of the permanent magnet 19 is controlled so that it is strong enough to latch the sphere 18 to the core 21 and hold the sphere in the display position. At the same time the flux density of permanent magnet 19 and the thickness of the disc 16 is selected to prevent this coercive force from retarding the rotation of sphere 18 when the magnetic poles of the core 21 are reversed. The angle of offset $\theta$ achieved by disturbing the center of mass of the core 21 in accordance wijh the principles of this invention assures the application of a rotation producing torque to the sphere 18 upon reversal of the magnetic poles of the core. This improves the responsiveness of the indicator while permitting the heretofore prohibited use of a wide range of electrical and magnetic design parameters.

Figure 6:
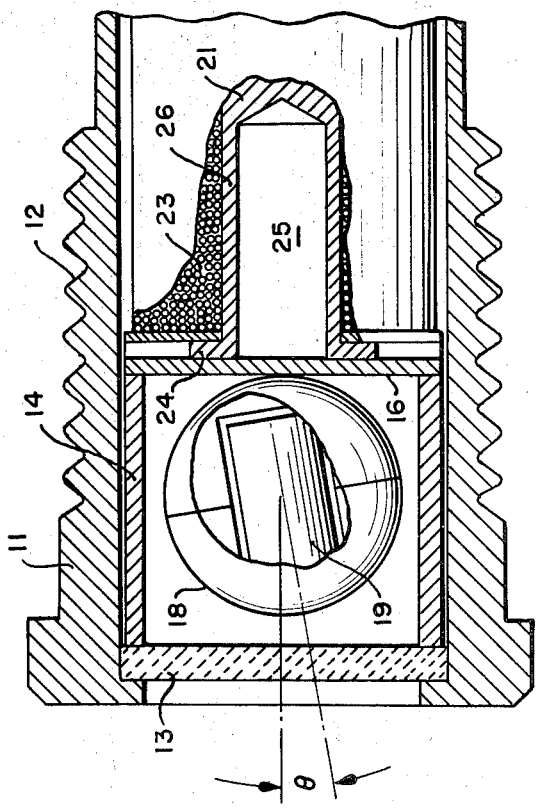
FIG. 6 is a side elevational view in partial cross-section illustrating the core of an alternative embodiment of the invention.

Referring now to FIG. 6 an alternative embodiment of the invention is illustrated. The casing 11, chamber 17, sphere 18, transparent window 13, coil 23, and means for energizing the coil as well as the indicators operation are the same as previously described. As shown the center line of permanent magnet 19 is offset an angle $\theta$ from the center line of the core 21 which may be provided with a circular flange 24 of uniform thickness throughout. A center bore 25, the diameter and depth of which is selected to control the angle of ofset $\theta$, provides uniformly spaced side walls 26 that offset and distribute the center of mass of the core around 360° of the axis.

The offset angle $\theta$ achieved by this invention is a function of the diameter of the bore 25 in the core and the resulting thickness of sidewalls 26. A minimum angle of 5° up to a maximum of 20° is preferred. The minimum offset angle $\theta$ required for an indicator in accordance with the invention is a function of the strength of the permanent magnet 19 as opposed to the strength of the opposite magnetic field generated by the coil as in the case of conventional indicators of this type in which an offset angle $\theta$ is not achieved.

The depth of the bore 26 is a function of the strength of the coil but preferably is equal to at least the diameter of the core 21 as a minimum.

In the operation of this embodiment, and assuming a North magnetic pole at end 24 of core and a South magnetic pole at the other, a winding of the coil 23 is pulsed to magnetize the core and selectively establish a South pole at the end 24 of the core and the North pole at the other end of the core. The latching force of the permanent magnet 19 offset from the core by the angle $\theta$ is overcome due to the magnetic attraction between the North and South poles of the permanent magnet and core 21 respectively. Because of the angle of offset $\theta$ a torque is exerted on the permanent magnet 19 and sphere 18, and the sphere rotates in the plane of the drawing as shown in FIG. 6 to assume the new display position.

In this instance, due to the uniform flange 24 and bore 26 in the core 21 and the resulting distribution of the center of mass of the core relative to the cores magnetic attraction to the permanent magnet 19, the sphere 18 rotates through less than 180° to assume an offset angle $\theta$ relative to the core 21 on the opposite side of the core 21. This reduction in the degree of rotation of the sphere 18 and the time required for the sphere to reach the new display position. This increases the responsiveness of the indicator. Upon deenergization of the coil 23 the permanent magnet again latches the sphere to the demagnetized core 21 in the offset display position.

Referring now to FIG. 7 another alternative embodiment of the invention is illustrated. In this arrangement a core 21 provided with a bore 26 as shown in FIG. 6 and as heretofore described, is encircled by a permanent ring magnet 27 magnetized along its length to return the sphere to its initial position upon deenergization of winding 23. The return or reset ring magnet 27 is of sufficient strength to overcome the latching force of permanent magnet 19 in the forward display position and in conjunction with the permanent magnet 19 effectively latches the sphere in the start or return position. The use of core 21 with bore 26 again holds the permanent magnet at an offset angle $\theta$ relative to the core in both the forward and start or return position.

Although preferred embodiments of the invention have been described in detail numerous changes and modifications may be made within the principles of the invention which is to be limited by the scope of the appended claims:

I claim:

1. An electromagnetic indicator comprising:
   a. A casing;
   b. A transparent cover at one end of said casing;
   c. A nonmagnetic shield within said casing, said transparent end and said nonmagnetic shield defining a chamber within said casing;

d. A sphere within said chamber free to rotate therein, said sphere bearing position identifying indicia thereon visible through said transparent end;

e. A permanent magnet having a North pole and a South pole at opposite ends thereof mounted within said sphere;

f. A reversibly magnetizable core within said casing separated from said sphere by said nonmagnetic shield;

g. Means formed on the end of said core adjacent said nonmagnetic shield for distributing the center of mass of said core about the longitudinal axis of said core, the distribution of mass of said core causing said permanent magnet to assume a position within said chamber wherein the axis thereof is offset at a positive angle relative to the axis of said core when said core is demagnetized, said permanent magnet being magnetically latched to said core in said condition at said angle of offset;

h. An electromagnetic coil surrounding said core within said casing; and i. Means for energizing said coil to momentarily magnetize said core and selectively and reversibly establish North and South magnetic poles respectively at the opposite ends of said core, said angle of offset of the axis of said permanent magnet relative to the axis of said core imparting a positive torque to said permanent magnet upon a reversal of the magnetic field of said core to cause rotation of said sphere within said chamber, the degree of rotation of said sphere being determined by the distribution of mass of said core.

2. An electromagnetic indicator as defined in claim 1 wherein said means for distributing the center of mass of said core comprises a shoulder formed on said end of said core adjacent said nonmagnetic shield, said shoulder determining the distribution of mass of said core and the angle of offset of the axis of said permanent magnet relative to the axis of said core.

3. An electromagnetic indicator as defined in claim 1 wherein said means for distributing the center of mass of said core comprises a bore in the end of said core adjacent said nonmagnetic shield, said bore forming sidewalls distributing the center of mass of said core, around 360° of the core axis, the diameter of the bore and resulting thickness of said sidewall determining the angle of offset of the axis of said permanent magnet relative to the axis of said core.

4. An electromagnetic indicator as defined in claim 3 wherein said means for distributing the center of mass of the end of said core includes a uniform circular flange formed thereon extending 360° around the core axis.

5. An electromagnetic indicator as defined in claim 1 including a second permanent magnet for returning said sphere to its original position following a rotation thereof upon demagnetization of said core.

6. An electromagnetic indicator as defined in claim 1 wherein said coil includes at least two windings, one for each direction of magnetization of said core.

7. An electromagnetic indicator as defined in claim 1 wherein said casing includes external means for mounting said electromagnetic indicator.

8. An electromagnetic indicator as defined in claim 3 wherein the depth of said bore and the lenght of said sidewall is at least equal to the diameter of said core.

9. An electromagnetic indicator as defined in claim 1 wherein said means formed on said core for distributing the mass there of causes rotation of said sphere through approximately 180° upon a reversal of the magnetic field of said core.

10. An electromagnetic indicator as defined in claim 1 wherein said means formed on said core for distributing the mass thereof causes rotation of said sphere through 180° less approximately twice the angle of offset of the axis of said permanent magnet relative to the axis of said core upon a reversal of the magnetic field of said core.

11. In an electromagnetic indicator wherein a permanent magnet having a North and a South pole at either end rotates a sphere to visually display positional identifying indicia on said sphere in response to the reversal of the magnetic field of an adjacent magnetic core, the axis of said permanent magnet and said core normally coinciding, when said core is demagnetized, the improvement comprising:

means formed on said core adjacent said permanent magnet for distributing the center of mass of said corewhereby the axis of said permanent magnet is offset at a positive angle of between 5° to 20° degrees relative to the axis of said core when said core is demagnetized, said angle of offset imparting a torque to rotate said sphere when the magnetic field of said core is reversed from its prior polarity.

* * * * *